United States Patent [19]

Tosh et al.

[11] Patent Number: 4,705,841

[45] Date of Patent: Nov. 10, 1987

[54] TBEA LINKED EPOXY-URETHANES

[75] Inventors: Douglas Tosh, Ajax; Michael Flynn, Cambridge, both of Canada

[73] Assignee: Sternson Limited, Brantford, Canada

[21] Appl. No.: 842,469

[22] Filed: Mar. 21, 1986

[51] Int. Cl.$^4$ .............................................. C08G 18/10
[52] U.S. Cl. ..................................... 528/59; 528/123; 528/369
[58] Field of Search .......................... 528/59, 123, 369

[56] References Cited

U.S. PATENT DOCUMENTS

| | | | |
|---|---|---|---|
| 2,830,038 | 4/1958 | Pattison | 528/59 |
| 3,020,262 | 2/1962 | Speranza | 260/47 |
| 3,445,436 | 5/1969 | Lake et al. | 528/65 |
| 3,525,779 | 8/1970 | Hawkins | 528/73 |
| 3,763,079 | 10/1973 | Fryd | 528/65 |
| 3,931,116 | 1/1976 | Bernstein et al. | 260/77.5 R |
| 4,111,917 | 9/1978 | Larsen | 528/45 |
| 4,143,009 | 3/1979 | Dewey | 521/178 |
| 4,267,288 | 5/1981 | Burkhart et al. | 525/438 |
| 4,282,123 | 8/1981 | Ilaria | 528/73 |
| 4,520,185 | 5/1985 | Tosh | 528/65 |

FOREIGN PATENT DOCUMENTS 672467 10/1963 Canada .
1137689 12/1982 Canada .
1197794 7/1970 United Kingdom .

OTHER PUBLICATIONS

Chemical Abstracts, (1978) 88:192924r.

Primary Examiner—Maurice J. Welsh
Attorney, Agent, or Firm—Barrigar & Oyen

[57] ABSTRACT

Novel epoxy-urethane resins are produced by the reaction of a urethane-alkanolamine adduct with an epoxy resin. The urethane-alkanolamine adduct is prepared by reacting a urethane prepolymer with a sterically hindered N-substituted ethanolamine such as t-butyl ethanolamine. The epoxy-urethane resin can be cured using ordinary epoxy curing agents for application as waterproofing membranes, joint sealants, and adhesives. Two-part resin systems comprising epoxy-urethane resins of the invention as the first part, and an appropriate curing agent as the second part avoid disadvantages characteristic of resin mixtures that rely on urethane cure chemistry.

8 Claims, No Drawings

TBEA LINKED EPOXY-URETHANES

FIELD OF THE INVENTION

U.S. Pat. No. 4,520,185, issued to the same assignee as the present invention, relates to epoxy-urethane copolymeric materials and methods of producing same by reacting epoxy resins with isopropyl or tertiary butyl alkanolamines to produce an epoxy-alkanolamine adduct, which is then reacted with urethane propolymers to produce a stable product that can be cured using conventional curatives effective in the curing of epoxy resins. The text of our previous U.S. Pat. No. 4,520,185 is incorporated herein by reference.

This invention relates to a novel and advantageous route to obtaining similar copolymeric products, by reacting urethane prepolymers with tertiary butyl ethanolamine to produce a urethane-alkanolamine adduct, which is then reacted with epoxy resin to produce a stable product that can be cured using conventional epoxy curatives.

BACKGROUND OF THE INVENTION

Epoxy-urethane polymeric compositions are known to possess physical properties which make them useful in applications such as elastomers, sealants and adhesives. Conventional epoxy resins such as those made by condensing epichlorohydrin with bisphenol A are readily and controllably cured by many types of materials to make products which exhibit high strength, but which are generally unsuitable for applications for which flexibility and elasticity are required.

By contrast, useful elastomeric materials can be made by the curing of urethane prepolymers (typically formed through the reaction of a diisocyanate and a glycol), using glycols, amino alcohols or diamines as vulcanizing agents. However, urethane-based resin compositions are known to present a number of practical problems, particularly in on-site mixed applications, stemming from the sensitivity of their cure chemistry to the presence of moisture and to the mix ratio. Typically, the use of urethane-based resin compositions as grouts, sealants or waterproofing membranes requires the on-site mixture of a resin component and a curative component in a specified mix ratio. Any departure from this mix ratio, which can readily occur by oversight or through the use of such two-component systems by unskilled persons, leads to unsatisfactory curing and inadequate physical properties of the cured resin.

A number of attempts have been made to produce resin-curative systems which exhibit at once the best features of both epoxies and urethanes. A curable liquid polyurethane-polyepoxide is described in U.S. Pat. No. 2,830,038 (Pattison). That material is prepared by reacting a polyurethane prepolymer with a hydroxy aliphatic epoxide compound such as glycidol. The resultant epoxide-terminated urethane prepolymer is then cured by mixing with polyamine compounds and heating for several hours at elevated temperatures.

U.S. Pat. No. 3,445,436 (Lake) similarly describes a sealant composition comprising a polyurethane prepolymer in which isocyanate groups are replaced by epoxy groups by reaction of a polyurethane prepolymer with hydroxy aliphatic epoxide compounds, or compounds containing an active hydrogen and aliphatic unsaturation capable of undergoing epoxidation in situ. Significant disadvantages presented by the preparation of the aforementioned known epoxy-urethanes stem from the high cost and relative instability of glycidol and of the related reactants employed to replace the isocyanate functionality of a urethane prepolymer with epoxide.

U.S. Pat. No. 4,143,009 (Dewey) describes a two-component composition for preparing an epoxy-urethane resin, in which the first component is a mixture of an organic diepoxide and a hydroxylakyl tertiary amine and the second part is an organic diisocyanate. The presence of free isocyanate groups in one of the resin components renders this composition subject to the disadvantages of urethane systems, principally susceptibility to moisture.

U.S. Pat. No. 4,262,288 (Burkhart) describes adhesive compositions formed by capping the polyester urethanes described in U.S. Pat. No. 3,763,079 (Fryd) with a dicarboxylic acid anhydride and chain-extending the capped polyester-urethane with an epoxy resin. The end products of this reaction are solids and must be dissolved in an appropriate organic solvent for use as adhesive compositions. Cross-linking (curing) of the dissolved epoxy-urethanes described by Burkhart is effected through available hydroxyl groups on the chain, using polyisocyanates or amino-formaldehyde resins, such as melamine-formaldehyde. It does not appear that curing of these epoxy-urethanes can usefully be effected through the epoxide functions of the chain, in contrast to the epoxy-urethanes of the present invention. The ability to use conventional epoxy curing agents is a substantial advantage of the epoxy-urethanes described and claimed herein, owing to the relative controllability and lower moisture sensitivity of the epoxy cure chemistry compared to that of isocyanates.

U.S. Pat. No. 4,520,185, issued to the same assignee as the present invention, relates to epoxy-urethane copolymeric materials which may be made by the reaction of epoxy resins with isopropyl and tertiary butyl alkanolamines to produce an epoxy-alkanolamine adduct, which is then reacted with urethane prepolymers. The product is a resin of block structure epoxy-urethane-epoxy which can be cured using conventional curatives effective in the curing of epoxy resins.

SUMMARY OF THE INVENTION

It has now been found that an epoxy-urethane resin, of block structure epoxy-urethane-epoxy, and having no free isocyanate groups, can be prepared using the highly sterically hindered alkanolamine, tertiary butyl ethanolamine (TBEA), as a linking molecule between the urethane and the epoxy. The synthetic route of the invention comprises the reaction of TBEA with a urethane prepolymer to form a urethane-alkanolamine adduct. The adduct is then reacted with a suitable epoxy resin to form an epoxy-urethane resin curable with an epoxy curing agent.

By contrast, the known synthetic route of U.S. Pat. No. 4,520,185 comprises the reaction of an alkanolamine (preferably isopropyl ethanolamine (IPEA)) with an epoxy resin to form an intermediate epoxy-alkanolamine adduct which can then be reacted with a urethane prepolymer to form a curable epoxy-urethane resin. The newly-discovered synthetic route possesses a number of advantages over the known synthesis employing an epoxy-alkanolamine intermediate, such as shorter production times and an intermediate having an extended shelf life.

The resins of the present invention require only a two-stage reaction for their preparation, using readily available reagents and simple reaction conditions. The resin has good shelf stability and can be compounded, then cured using conventional epoxy curing agents to form a wide variety of products useful in applications such as waterproofing membranes, joint sealants and adhesives, in lieu of conventional polysulphide, polyurethane or flexibilized epoxies. Unlike conventional two-component urethane resin systems, the epoxy-urethane resin of the present invention obviates the necessity for very accurate mixing ratios between the resin and curative components. Further, the resins of the present invention have excellent adhesion to a range of substrates, without priming, and have a cure chemistry which can tolerate low temperatures and high humidiy, permitting the use of the epoxy-urethanes of this invention under a wide range of environmental conditions.

DETAILED DESCRIPTION OF THE INVENTION

The epoxy resins useful for the purposes of this invention are those compounds containing two or more reactive epoxy groups per molecule. In particular, the class of epichlorohydrin-bisphenol A resins such as those sold under the trademark Epon may be used. Preferred for use in this invention are the liquid resins Epon 828 and Epon 813, each having an epoxide equivalent weight of approximately 190 g, and mixtures thereof. The epoxide equivalent weight (EEW) is defined as the weight of material, in grams, containing one gram equivalent of epoxide groups. Epon 828 is a diglycidyl ether of bisphenol A and Epon 813 contains a similar epoxy compound but in addition a small amount of butyl glycidyl ether, which acts as a reactive diluent to reduce the viscosity of the resin.

The urethane prepolymers useful for the purposes of this invention include low moleculer weight, isocyanate-terminated liquid or low-melting polyurethanes having at least two isocyanate groups, such as, for example, the reaction products of glycol polyethers or glycol polyesters with aromatic di-isocyanates. Examples are well known in the art, such as those sold by Uniroyal, under the trademark Vibrathane or by Mobay, under the trademark Desmodur. The following table indicates characteristics of Vibrathane series urethane-prepolymers, that have been found useful for this invention.

| Urethane Prepolymer | Composition | Amine Equivalent Weight |
|---|---|---|
| Vibrathane 809 | Polyether-MDI* | 1025 g |
| Vibrathane 6008 | Polyester-TDI** | 1350 g |
| Vibrathane B602 | Polyether-TDI | 1330 g |
| Vibrathane B729 | Blend of 809 & B602 | 1176 g |
| Desmodur E14 | Polyether-TDI | 1200 g |

*MDI has the structure

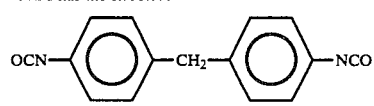

**TDI has the structure

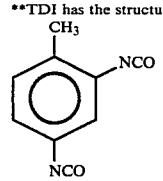

The amine equivalent weight of the isocyanate-containing urethanes, defined as the number of grams of isocyanate which is consumed by one gram mole of a secondary amine, is a direct measure of the isocyanate equivalent weight and provides a measure of the isocyanate functionality of the urethane prepolymer. These isocyanate groups are available for reaction with the hydroxyl groups of the alkanolamine molecule to link the urethane-alkanolamine adduct to the epoxy resin, according to the method of the invention.

URETHANE-ALKANOLAMINE ADDUCTS

It has been found that di- and polyfunctional urethane prepolymers can be reacted with tertiary butyl ethanolamine to produce a product which is stable long enough to further react the urethane-ethanolamine adduct with the appropriate epoxy resin. It is known in the chemistry of urethanes that the reactivity of isocyanates is greater with hydroxyl groups than with secondary amino groups. For this reason, it was originally expected that an N-substituted alkanolamine could be reacted with a urethane prepolymer to give an amine-terminated intermediate adduct material which could then be reacted further with an epoxy resin to produce the desired epoxy-urethane-epoxy copolymeric resin structure. However, experiments with a number of N-substituted alkanolamines, such as ethyl ethanolamine and IPEA were unsuccessful. It is now believed that the secondary amino hydrogen of such alkanolamines reacts preferentially with isocyanate functions of the urethane prepolymer.

We have discovered that when a urethane prepolymer is reacted with an N-substituted alkanolamine in which the secondary amino hydrogen is subject to strong steric hindrance-as in TBEA—a urethane-alkanolamine adduct will be produced having free secondary amine groups that are derived from the alkanolamine component of the adduct. These secondary amine groups are sufficiently hindered, owing to steric effects, that they do not undergo any further reaction immediately with the urethane prepolymer. The hindered amine groups of the urethane-alkanolamine adduct can subsequently react with the epoxide groups of an epoxy resin to form the epoxy urethane polymer of this invention.

The applicant does not wish to be bound by a specific theory as to the reaction scheme by which the polymers of its invention are produced, but it would appear the principal reaction between a urethane prepolymer (component A) and tertiary butyl ethanolamine to produce a typical urethane-alkanolamine addduct (component B) is as follows:

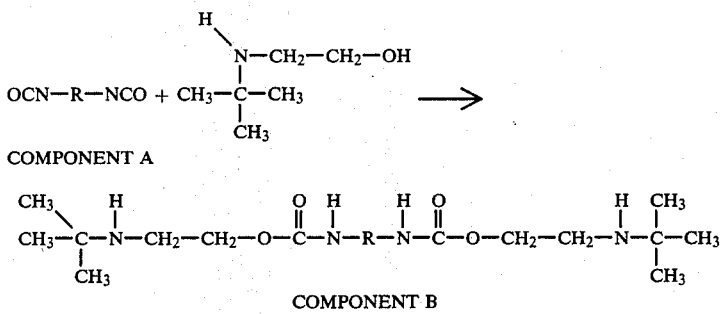

COMPONENT A

COMPONENT B

To produce epoxy-urethane-epoxy copolymers of the kind represented by component D, illustrated below, adduct B can then be reacted with an epoxide-terminated linear resin (component C below). In the following representative reaction scheme, component C is an epoxide-terminated linear resin, which is reacted with the urethane-alkanolamine adduct using an excess of the epoxy resin, so that all of the available hindered amine groups of the urethane-alkanolamine are reacted.

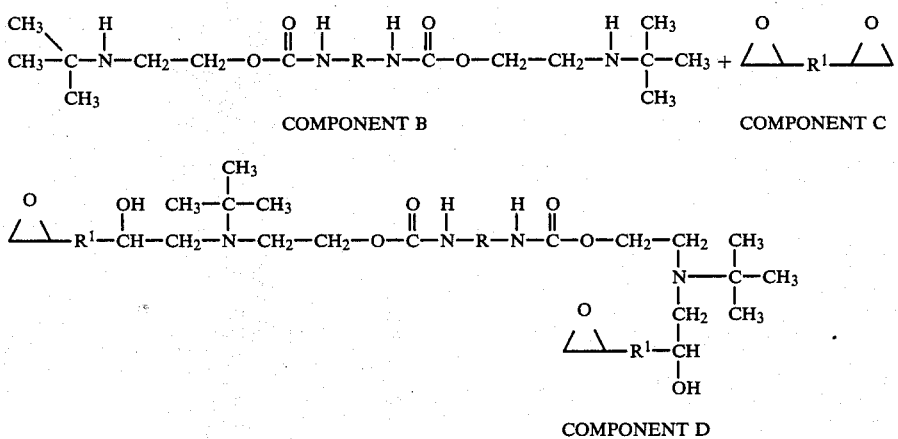

COMPONENT B            COMPONENT C

COMPONENT D

Epoxy-urethane resins of the invention, as illustrated by component D, can be used alone or compounded with diluents, fillers and plasticizers as one component of a two-component resin system, the second component being any suitable epoxy curing agent. Among the advantages of the epoxy-urethane resins according to the present invention is the absence of any residual isocyanate groups.

Substituted alkanolamines having primary amino groups and secondary alkanolamines having less bulky alkyl substituents than tertiary butyl were found to be unsatisfactory in the preparation of a urethane-alkanolamine adduct, because the less sterically hindered amines reacted immediately with the NCO groups of the urethane prepolymer resulting in the production of a solid mass.

REACTION CONDITIONS

All reactions were carried out under nitrogen. Small scale reactions (50–100 g) were carried out in metal cans with spatula stirring. Large scale reactions (200–1500 g) were carried out in one L or two L resin reaction kettles using an air driven stirrer.

In the first stage of the reaction scheme, a suitable urethane prepolymer is reacted with TBEA. A ratio of one hydroxyl equivalent to one isocyanate equivalent is used.

The urethane prepolymer and the TBEA are reacted at 50° C., the temperature at which TBEA becomes liquid. The reaction is almost instantaneous and is exothermic. By contrast, the reaction between IPEA and an epoxy resin to form the epoxy-alkanolamine adduct of U.S. Pat. No. 4,520,185 is much slower, requiring the application of heat and a working-up period of some forty-five minutes. The level of free isocyanate can be monitored by infrared spectrometry, using the strong characteristic absorption peak at 2260 cm.$^{-1}$, which disappears as the isocyanate is consumed.

The mixture is then heated to 90° C. and the epoxy resin is added slowly. The progress of the reaction between the epoxy resin and the urethane-alkanolamine adduct is followed by sampling the mixture at selected times, and conducting an epoxide equivalent weight analysis of the samples taken. Briefly, the analytical method used involves reacting the epoxy groups with hydrogen bromide generated in situ. Excess HBr is determined by an indicator color change. The method used is substantially theat described in test method bulletin, entitled "Determination of 1, 2-epoxy Groups in Epikote Resins and Cardura E-10", appearing in the Epikote Technical Manual E P 1.5.2 Second Edition (Shell Chemicals).

The final reaction product is an epoxy-urethane polymer which can be cured at room temperature, using standard epoxy curatives such as suitable aliphatic or aromatic amines, amido amines and polyamides.

PHYSICAL TESTING OF THE CURED RESIN

The epoxy urethanes and curative agents were mixed by spatula in metal cans. When pot life permitted, degassing under vacuum was carried out, then a sheet was poured onto Teflon, or Teflon-sprayed glass. After a room temperature cure, most samples were tested after seven days for tensile strength elongation to break (ASTM D412), Die C tear (ASTM D624) and after six days for Shore D hardness (ASTM D2240). Shore D hardness was also tested after twenty-eight days at room temperature.

The invention will be further understood by consideration of the following examples, which are provided by way of illustration:

EXAMPLE 1

542 grams of Vibrathane B809 (amine equivalent weight 1025) was reacted with 63.6 grams of TBEA (amine equivalent weight=hydroxyl equivalent weight=117) to form the urethane-alkanolamine adduct. The adduct was reacted to completion with 375 grams of Epon 828 (epoxide equivalent weight 190). 4.9 grams of TETA was added as curative, and the mixture cured at room temperature. The resulting product has a tensile strength of 827 psi, a percent elongation to break of 40%, a Die C tear of 128 lb/in, and a Shore A hardness of 70.

EXAMPLE 2

601 grams of Vibrathane B729 (amine equivalent weight=1176) was reacted with 56 grams of TBEA to form the adduct. 375 grams of Epon 828 were then added to complete the reaction. Varying amounts of TETA were added as curative to optimize the physical characteristics of the epoxy-urethane polymer. When 6.1 grams of TETA were added, the optimum tensile strength of 1220 psi was realized. Elongation was 50%. Shore A hardness was 82, and Die C tear strength was 130 lb/in.

EXAMPLE 3

A. 601 grams of Vibrathane B729 was reacted with 63.6 grams of TBEA to form the urethane-alkanolamine adduct. The adduct was reacted with 375 grams of Epon 828 to completion.

B. 375 grams of Epon 828 was reacted with 63.5 grams of TBEA to form an epoxy-alkanolamine adduct. This adduct was then reacted with 601 grams of Vibrathane B729 to completion.

B is referred to as the "epoxy-alkanolamine reaction", being the subject of the previous patent, U.S. Pat. No. 4,520,185. A is referred to as the "urethane-alkanolamine reaction", the subject of the present invention. Both reactions lead to essentially similar products.

The physical characteristics of the two polymers are given in the following table:

| Polymer | TETA Used | % Elongation | Shore A | Tensile Strength | Tear Strength |
|---|---|---|---|---|---|
| A | 6.1 g | 50 | 82 | 1220 psi | 130 lb/in |
| B | 6.1 g | 45 | 84 | 1133 psi | 140 lb/in |

EXAMPLE 4

Even a slight variance in the amount of raw materials does not have a significant effect on the physical characteristics of a cured sample of the epoxy-urethane resin:

A—(epoxy-alkanolamine): 375 grams Epon 828 were reacted with 63.6 grams TBEA to form an epoxy-alkanolamine adduct which was further reacted with 573 grams of Vibrathane B809.

B—(urethane-alkanolamine): 542 grams of Vibrathane B809 were reacted with 63.6 grams of TBEA to form a urethane-alkanolamine adduct which was further reacted with 373 grams of Epon 828.

The physical characterisics of the cured polymers are given in the following table:

| Polymer | TETA Added | % Elongation | Tensile Strength |
|---|---|---|---|
| A | 6.1 g | 40 | 1125 psi |
| B | 6.1 g | 47.5 | 1166 psi |

EXAMPLE 5

521.9 grams of Desmodur E14 (amine equivalent weight 1200) was reacted with 50.1 grams of TBEA to form the adduct. The adduct was then reacted with 300 grams of Epon 828. Using TETA as the curative, a product was obtained having a tensile strength of 750 psi, a percent elongation to break of 45%, a Die C tear strength of 32 pli and a Shore A hardness of 74.

EXAMPLE 6

In this example, the urethane prepolymer which was reacted with TBEA was not a commercially available material, but was prepared by reacting 288.7 grams of Pluracol P1010 (trademark of a polyether diol sold by Basf), with 84 grams of Isonate 143L, a difunctional isocyanate manufactured by Upjohn. The equivalent weights of Pluracol P1010 and Isonate 143L are about 1,000 and 144, respectively. The synthesis of prepolymer was carried out under nitrogen at 70° C. for two hours.

The prepolymer made as above, was then reacted with 34.4 grams of TBEA, and the urethane-alkanolamine adduct further reacted with 196 grams of Epon 828. It was found that the resulting epoxy-urethane could be cured using any of the conventional epoxy curatives. Curing with TETA gave rise to a product having a tensile strength of 489 psi, a percent elongation to break of 80%, a Die C tear strength of 35 pli and a Shore A hardness of 45.

A large number of other compositions were made, cured and tested. It has been found that the particular choice of curing agent has a more significant effect on the final properites of the product than the choice of filler or plasticizer. Cured epoxy-urethane resins exhibiting a combination of good elongation to break plus high tensile strength and tear resistance can be obtained by curing the formulation with Ancamine LO, DMP-30, or mixtures thereof.

There have been in the past some market resistance to two-component urethane membrane systems because of the necessity for very accurate resin/curative mixtures and the problem of moisture-sensitivity of the isocyanate-containing urethane. It has been found that for epoxy-urethane resins of the present invention, a deviation from stoichiometric amounts of curing agent of up to 30% results in relatively small changes in the physical properties of the cured polymer by comparison with previous two-component urethane membrane systems.

The examples given above are illustrative of the properties of epoxy-urethane polymers according to the present invention. Modifications which do not depart from the spirit of the invention will be apparent to those skilled in the art, and the scope of the invention is thus to be defined solely by the scope of the appended claims.

What is claimed is:

1. A process for making an epoxy-urethane curable with an epoxy curing agent, comprising the steps of
   (a) reacting a quantity of isocyanate terminated polyurethane prepolymer with tertiary butyl ethanolamine, such that the hydroxyl equivalents of said tertiary butyl ethanolamine are approximately equal to or exceed the isocyanate equivalents on said polyurethane prepolymer to produce a urethane-alkanolamine adduct substantially free of isocyanate functionality,
   (b) monitoring the infrared absorption of the reaction mixture of step (a) until all of the isocyanate has been consumed,
   (c) adding to the reaction mixture a quantity of epoxy resin having an epoxide functionality of two or greater in proportion such that the epoxide equivalents are in excess of the amine equivalents of the urethane-alkanolamine adduct.

2. A process according to claim 1, wherein the relative proportions of said epoxy resin and the urethane-alkanolamine adduct are selected so that the epoxide equivalents on said epoxy resin exceed the amine equivalents on said urethane-alkanolamine adduct by a ratio lying in the range of 2.0 to 10.0.

3. A process according to claim 1 or claim 2, further comprising the step of adding an inert filler to the reaction mixture.

4. A process according to claim 1 or claim 2, further comprising the step of adding a non-reactive plasticizer to the reaction mixture.

5. A process for making an epoxy-urethane curable with an epoxy curing agent, comprising the steps of
   (a) reacting a quantity of isocyanate terminated polyurethane prepolymer with tertiary butyl ethanolamine such that the hydroxyl equivalents of said tertiary butyl ethanolamine are approximately equal to or exceed the isocyanate equivalents on said polyurethane prepolymer to produce a urethane-alkanolamine adduct substantially free of isocyanate functionality,
   (b) monitoring the infrared absorption of the reaction mixture of step (a) until all of the isocyanate has been consumed,
   (c) adding to the reaction mixture a quantity of epoxy resin having an epoxide functionality of two or greater in proportion such that the epoxide equivalents are in excess of the amine equivalents of the urethane-alkanolamine adduct,
   (d) determining the epoxide equivalent weight of said first part,
   (e) providing a second part comprising approximately one amine equivalent per epoxide equivalent of said first part of an epoxy curing agent,
   (f) mixing said first and second parts to provide a curable composition, and
   (g) allowing said curable composition to cure.

6. A process according to claim 5, wherein said proportions of liquid epoxy resin and tertiary butyl ethanolamine are chosen so that the ratio of epoxide equivalents on said epoxy resin to amine equivalents on said tertiary butyl ethanolamine lies in the range of about 2.0 to 10.0.

7. A process according to claim 5 or 6, further comprising the step of adding an inert filler to said first part.

8. A process according to claim 5 or claim 6, further comprising the step of adding a non-reactive plasticizer to said first part.

* * * * *